United States Patent
Dennie (10) Patent No.: US 6,341,338 B1
(45) Date of Patent: Jan. 22, 2002

(54) PROTOCOL FOR COORDINATING THE DISTRIBUTION OF SHARED MEMORY

(75) Inventor: Shaun Dennie, Westminster, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/244,135

(22) Filed: Feb. 4, 1999

(51) Int. Cl.[7] ............................................. G06F 12/00
(52) U.S. Cl. ...................... 711/147; 711/148; 711/152; 711/153; 711/170
(58) Field of Search ............................. 711/100, 147, 711/148, 152, 153, 154, 170

(56) References Cited

U.S. PATENT DOCUMENTS

| | | | | |
|---|---|---|---|---|
| 5,499,349 A | * | 3/1996 | Nikhil et al. | |
| 5,530,816 A | * | 6/1996 | Holt | |
| 5,675,790 A | * | 10/1997 | Walls | 711/171 |
| 5,784,698 A | * | 7/1998 | Brady et al. | 711/171 |
| 5,963,975 A | * | 10/1999 | Boyle et al. | 711/147 |
| 5,978,892 A | * | 11/1999 | Neel et al. | 711/170 |
| 5,991,893 A | * | 11/1999 | Snider | 714/4 |
| 6,044,438 A | * | 3/2000 | Olnowich | 711/130 |
| 6,101,525 A | * | 8/2000 | Hecker | 709/104 |
| 6,125,430 A | * | 9/2000 | Noel et al. | 711/152 |

OTHER PUBLICATIONS

Ian Foster, *Designing and Building Parallel Programs*, Addison–Wesley Publishing Company, 1995.
Barry Wilkinson and Michael Allen, *Parallel Programming*, Prentice Hall, 1999.
David E. Culler and Jaswinder Pal Singh, *Parallel Computer Architecture*, Morgan Kaufman Publishers, Inc., 1999.
Sun Microsystems Computer Company, *Prism 5.0 Reference Manual*, Revision A., Nov. 1997.

* cited by examiner

*Primary Examiner*—Tuan V. Thai
(74) *Attorney, Agent, or Firm*—Finnegan, Henderson, Farabow, Garrett & Dunner, L.L.P.

(57) ABSTRACT

Methods, systems, and articles of manufacture consistent with the present invention coordinate distribution of shared memory to threads of control executing in a program by using a cooperative synchronization protocol. The protocol serializes access to memory by competing threads requesting assignment of memory space, while allowing competing threads that have already been assigned memory space, to share access to the memory. A designated area of memory assigns the memory to requesting threads. The protocol is an application level entity and therefore does access the operating system to serialize the memory allocation process.

14 Claims, 5 Drawing Sheets

PROTOCOL FOR COORDINATING THE DISTRIBUTION OF SHARED MEMORY

FIELD OF THE INVENTION

This invention relates generally to multi-threaded applications, and more particularly to methods for coordinating the distribution of shared memory to threads of control executing in a data processing system.

BACKGROUND OF THE INVENTION

Multi-threading is the partitioning of a computer program that performs a particular process into logically independent "threads" of control that can execute in parallel. Each thread includes a sequence of instructions and data used by the instructions to carry out a particular program task, such as a computation or input/output function.

Although a single processor can execute instructions of only one thread at a time, the processor can execute multiple threads in parallel by, for example, executing instructions corresponding to one thread until reaching a selected instruction, suspending execution of that thread, and executing instructions corresponding to another thread, until all threads have completed. In this scheme, as long as the processor has begun executing instructions for more than one thread during a given time interval all executing threads are said to be "running" during that time interval, and multi-processing is achieved.

A process includes multiple threads operating out of a common address space. Processes may be configured such that portions of their address space are shared, that is, are mapped to a common physical location, or a memory. Multiple threads within a process share portions of that memory address space. It is possible for more than one thread to believe it has sole access to a portion of memory and for it to perform a series of reads and writes to an area of memory while another thread is performing reads and writes to the same area of memory. Such concurrent operation by competing threads may confuse operation of a process. Therefore, in a shared memory environment the shared memory must be allocated to each thread based on a coordination technique ensuring that only one thread has access to an area of shared memory at a time.

Current memory allocation techniques assign address space to threads in one of two ways: distribution or mutual exclusion. Distribution techniques partition shared memory into equal-sized blocks and assign the memory blocks to threads as requested. Each memory block must be large enough to meet the memory requirements of the thread requiring the most memory. Total memory requirements are dictated by the maximum demand for access to shared memory of a given thread multiplied by the total number of threads involved. This method is particularly wasteful when individual threads do not require similar amounts of shared memory. Even slight differences in the threads' memory requirements can have a significant impact on the total memory requirement.

Mutual exclusion techniques, which may be implemented in hardware or software, coordinate use of shared memory among threads by reading and writing shared variables and pointers referring to the shared addresses. Implementation of these techniques requires accessing the operating system, which is both slow and expensive.

In a mutual exclusion implementation the operating system only permits one thread at a time to access shared memory. Shared memory is assigned to a thread by exchanging signals between threads, such that a thread can be forced to stop at a specified point during execution until it has received a specific signal. More specifically, the operating system may allow a thread to access shared memory by locking the shared memory, allocating the memory for exclusive use of the thread, and unlocking the memory once the thread has completed the memory operation.

While the memory area is locked other threads are prevented from accessing it until the lock has been removed. This method is an acceptable way of allocating memory for one-time or infrequent operations, for example, the one-time startup required by a process. However, computing generally requires execution of operations that occur hundreds or even thousands of times per second, for example, when many threads are modifying a common memory area by performing a "write" operation. For such operations this method of locking and unlocking shared memory creates bottlenecks in system performance. As the number of threads making demands on system performance increases, the likelihood of a system bottleneck increases. This of course negatively impacts system performance.

SUMMARY OF THE INVENTION

Methods, systems, and articles of manufacture consistent with the present invention allocate blocks of a shared memory to threads during execution in a data processing system. Methods, systems, and articles of manufacture consistent with the present invention, as embodied and broadly described herein, involve operations that include receiving a memory allocation request, determining whether access to the shared memory is permitted for purposes of the allocation request, identifying a next available memory block in response to the memory allocation request, and designating the next available memory block in response to the request.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Overview

In accordance with methods and systems consistent with the present invention, a programmer writing a multi-threaded application program specifies in the program a total amount of memory space to be shared by the program threads during execution. The programmer also specifies a "block size," that is, the size of each partition of the total memory space to be allocated on an as-needed basis to the threads during execution. Blocks of the shared memory space are allocated to the threads serially, meaning that when a thread requires memory (for example, the computational task being performed by the thread exceeds the thread's current memory allocation), the thread determines whether its request can be processed and, if so, the thread is allocated the next available block in the shared memory space. Each thread may have a unique identifier and all thread identifiers may be provided at the beginning of program execution. Memory blocks may be assigned to the threads using the identifiers. Information may also be maintained in a designated area of the shared memory to identify each thread by its identifier as well as the specific block(s) of shared memory assigned to each thread.

A next available block indicator located in a designated area of the shared memory maintains information identifying the location (i.e., beginning address) in the shared memory for the next available block. Since all blocks are the same size, the indicator is simply updated by a fixed value based on the block size at the conclusion of each memory allocation cycle.

The programmer also specifies a shared memory protocol for the threads. This protocol, which may be included as part of the program itself or separate from the program, consists of a set of rules governing the way in which threads cooperate to access the shared memory for purposes of performing the memory allocation function. According to this protocol, when a thread requires memory, it first determines whether another thread is currently accessing the shared memory space for memory allocation purposes. This may be done by providing a "token" in a designated area of the shared memory space. The needy thread determines whether the token is available, meaning that no other thread is accessing the shared memory space to be allocated a memory block. If the token is available, the needy thread "takes" the token (i.e., indicates that the token is not currently available) and proceeds to be allocated the next available block.

If, however, the token is "taken," meaning that another thread is accessing the shared memory space to be allocated a memory block, the needy thread does not proceed. Rather, the needy thread monitors the token, waiting for it to become available, at which time the thread can be allocated a next available memory block.

Once a thread completes the allocation process, it releases the token, thus making the token available for other memory allocation cycles. At the completion of an allocation cycle the next available block indicator is updated so that the next time a thread seeks to be allocated a memory block the indicator reflects the next available block.

Although access to the shared memory space is exclusive to a single thread for purposes of the allocation process, all of the threads operating in parallel can access their designated block(s), even when the allocation process for a particular thread is ongoing. The only restriction in this scheme relates to memory block allocation, only one thread at a time can be allocated a block. Additionally, all of the threads potentially have access to all of the shared memory space. In other words, no thread has exclusive control over a particular block or set of blocks specified at the beginning of program execution.

Computer Architecture

Figure 1:
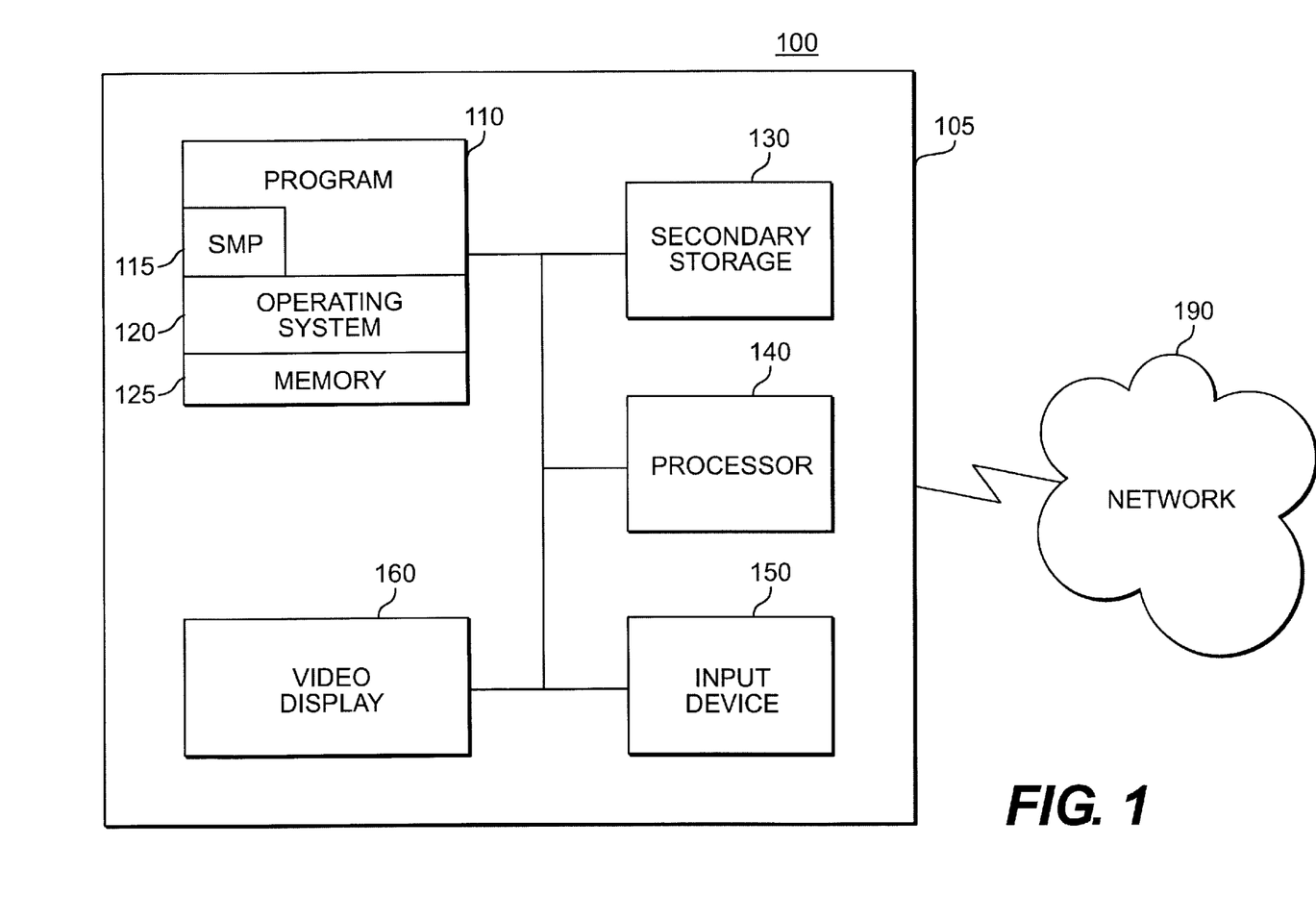
FIG. 1 depicts a block diagram of a data processing system suitable for practicing methods and systems consistent with the present the invention.

FIG. 1 depicts an exemplary data processing system 100 suitable for practicing methods and implementing systems consistent with the present invention. Data processing system 100 includes a computer system 105 connected to a network 190, such as a Local Area Network, Wide Area Network, or the Internet.

Computer system 105 contains a main memory 125, a secondary storage device 130, a processor 140, an input device 150, and a video display 160. All of these components operate in a manner commonly understood by those skilled in the art. For example, processor 140 executes an operating system and application programs. Input device 150 receives user input and video display 160 displays output, for example, from an application program being executed by processor 140.

Main memory 125 and secondary storage device 130 may be used to store all of portions of the operating system and applications programs when they are not being executed by processor 140. For purposes of this description, however, main memory 125 is shown in FIG. 1 as including both an operating system 120 and application program 110. Operating system 120 represents any operating system, although an operating system that specifically facilitates multi-threaded program execution may be preferred, for example, the Solaris® operating system from Sun Microsystems, Inc.

Application program 110 is a multi-threaded program that performs a particular process using independent, logical threads of control that execute in parallel on processor 140. Although a single processor is shown, one skilled in the art will appreciate multiple processors may be used to implement methods and practice systems consistent with the present invention.

During execution of application program 110, its threads share access to main memory 125 and secondary storage 130. Specific implementations of memory in a data processing system may use a virtual memory to store some of the data associated with a process, allowing main memory to store data associated with more processes. In that type of system threads also share access to the virtual memory area.

Application program 110 includes a shared memory protocol 115. Shared memory protocol 115 provides a set of guidelines for threads to follow when accessing memory. Shared memory protocol 115 interacts with the threads of an application running in program 110 and with memory 125. One skilled in the art will appreciate that other implementations consistent with the present invention may implement shared memory protocol 115 separate from program 110 in either software or hardware.

Although aspects of this implementation are depicted as being stored in memory 125, one skilled in the art will appreciate that all or part of system and methods consistent with the present invention may be stored on or read form other computer-readable media, such as secondary storage devices, like hard disks, floppy disks, and CD-ROM; a digital signal received from a network such as the Internet; or other forms of ROM or RAM.

Figure 2:
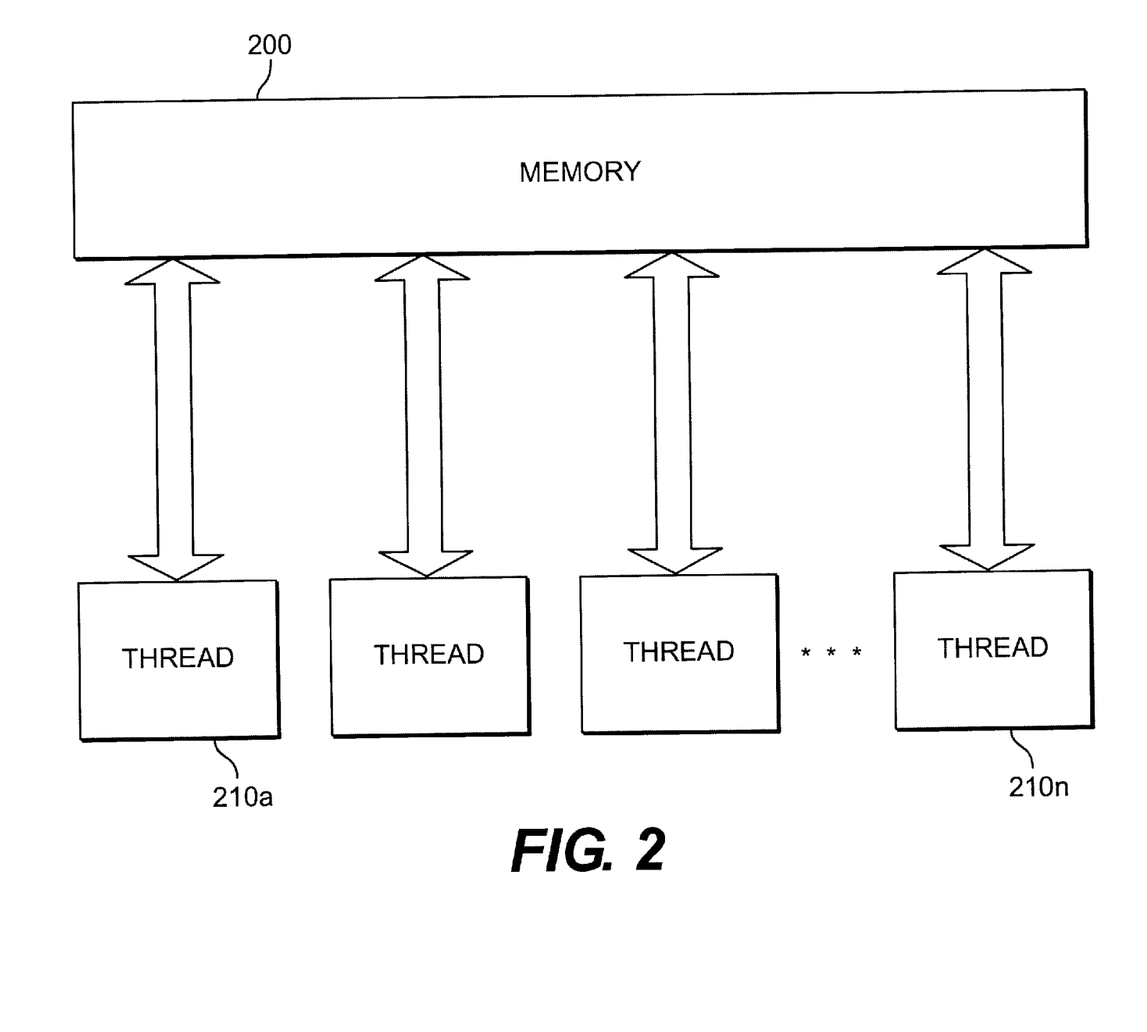
FIG. 2 depicts a logical view of multiple threads accessing a shared memory.

FIG. 2 depicts a logical representation of multiple threads sharing access to memory. When multiple threads share access to memory, each of the threads is able to access any portion of the memory. FIG. 2 shows multiple threads $210_a$–$210_n$ sharing access to memory 200. Because each of the threads $210_a$–$210_n$ may simultaneously access all of memory, it is possible for more than one thread use a portion of memory being used by another thread, confusing an operation. Therefore, threads operating in a shared memory environment compete for use of memory. Methods and systems consistent with the present invention are directed to coordinating the distribution of access to shared memory by competing threads.

Shared-Memory Allocation and Distribution System

Figure 3:
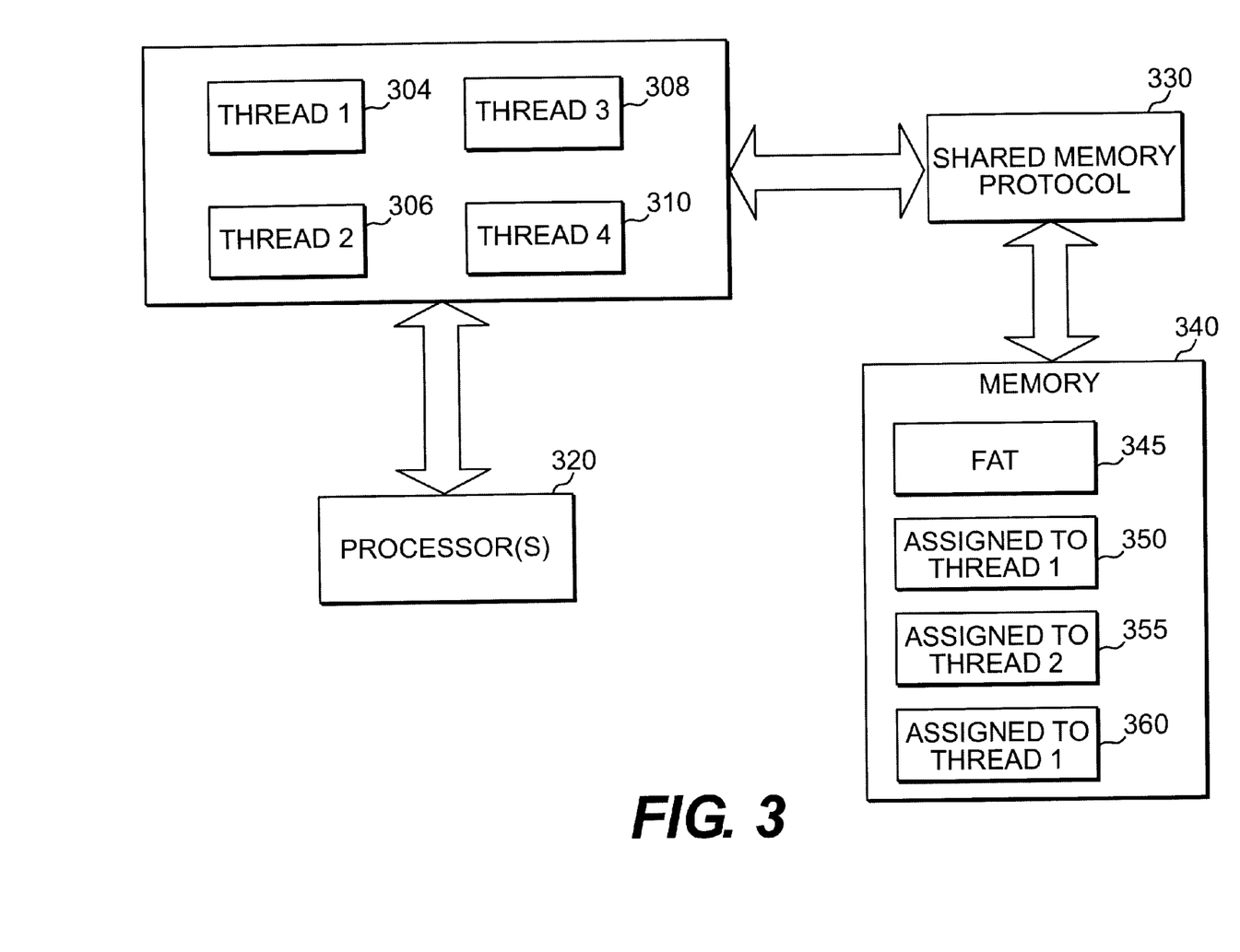
FIG. 3 depicts a block diagram used to explain the operation of a shared memory system operating in accordance with a shared memory protocol consistent with the present invention.

FIG. 3 is a logical representation of a shared memory configuration consistent with the present invention. Threads 304, 306, 308, and 310 may correspond to one or more processes that are being executed concurrently by processor 320. Again, although one processor 320 is shown in FIG. 3, methods and systems consistent with the present invention may operate in multi-processor environments as well.

Memory 340 includes a file allocation table ("FAT") 345. To facilitate parallel execution of multiple threads, memory 340 is logically partitioned into segments of equal size, as designated by a user of a shared memory system operating in accordance with the principles of the shared memory protocol 330. The partition size is used to assign a block of memory, corresponding to address space, to a thread.

When an application program begins execution and spawns its threads, each thread agrees to access memory 340 according to the rules of shared memory protocol 330. Shared memory protocol 330 describes the format of the FAT 345 to each thread. According to protocol 330, each thread agrees to view an indicator indicating whether another thread is accessing memory, to be allocated a block, before securing memory for itself. The protocol 330 allows threads that have already secured access to a block of memory to use that block for the duration of the application's execution. Each time a thread needs to secure access to a new block of memory, it must follow the rules of the shared memory protocol 330.

For example, if thread 304 has secured access to memory block 350, it may access that block of memory for the duration of a program's execution. However, while thread 306 secures access to memory block 355, thread 304 may not attempt to secure access to another block of memory 340. While thread 306 secures access to a block of memory 340, thread 304 may only access the block(s) of memory it has already secured. Once the indicator in the FAT 345 indicates that thread 306 has completed its secure operation, thread 304 may attempt to secure an additional block of memory.

The FAT 345 is used to assign a block of memory to a thread. Included in the FAT 345 are tables corresponding to current assignments of blocks of memory to threads using shared memory 340, an indicator reflecting whether a thread is currently attempting to secure access to a block of memory, and a pointer indicating a next available memory block. A thread secures access to a block of memory by receiving an assignment of a block of memory from the FAT. When a thread secures a block of memory, it increments a pointer in the FAT to the next available memory block, shown in FIG. 4.

Figure 4:
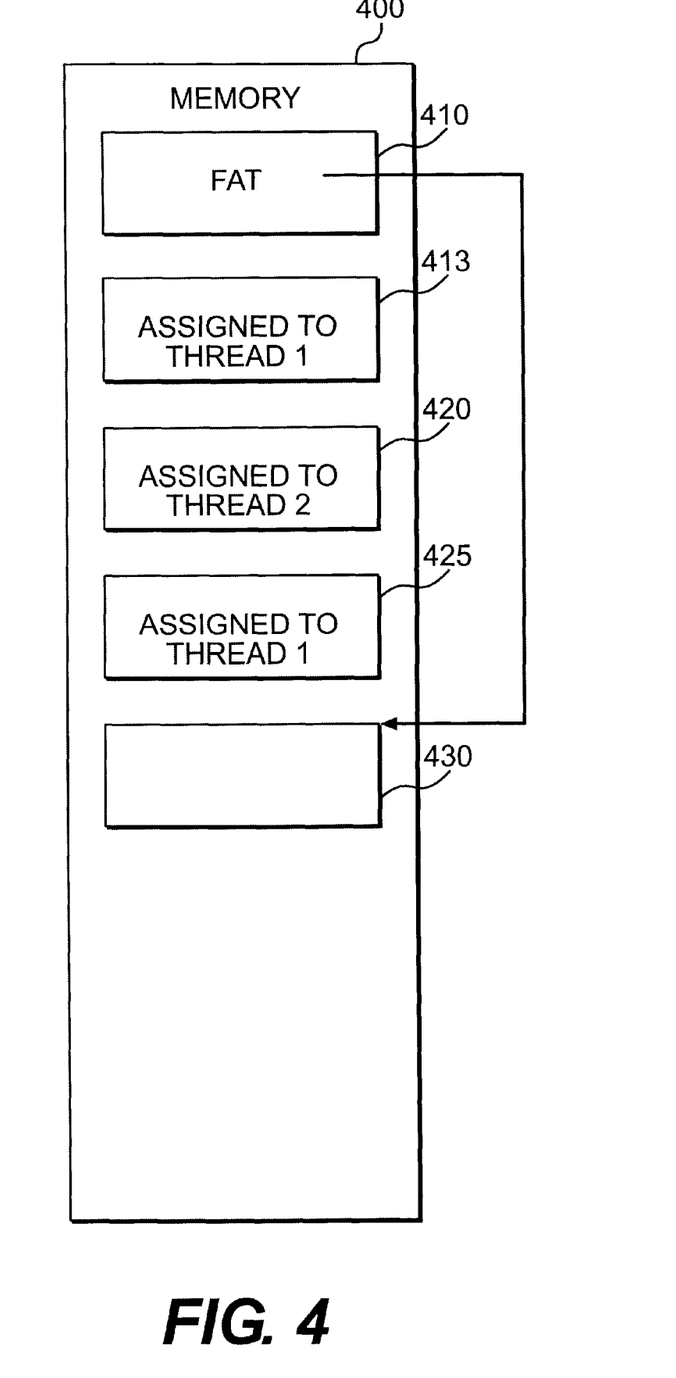
FIG. 4 depicts a physical representation of threads being allocated blocks of a shared memory in a manner consistent with the present invention.

FIG. 4 is a physical representation of how a shared memory 400 may be allocated to threads and maintained by methods and systems consistent with the present invention. Before a program executes, a user specifies both the size of a shared memory 400 and the size of individual memory blocks 415, 420, 425, and 430. Each memory block corresponds to a set of addresses. Once the size of the shared memory 400 and the size of its blocks 415, 420, 425, and 430 have been assigned, they remain constant throughout a program's execution.

Each thread that accesses memory 400 in accordance with the principles of the present invention is uniquely identifiable. Upon a first thread in a process beginning to execute, the process is assigned a process identification code. When a thread receives assignment of a memory block it is assigned a thread identification code and a memory location code. Each thread of a program may be uniquely identified by a global thread identification code, a combination of a process identification code for the process corresponding to the thread, and a thread identification code. This identification feature enables methods and systems consistent with the present invention to handle any parallel processing application, including multi-threaded applications as well as multi-processor applications running processes containing multiple threads.

Figure 5:
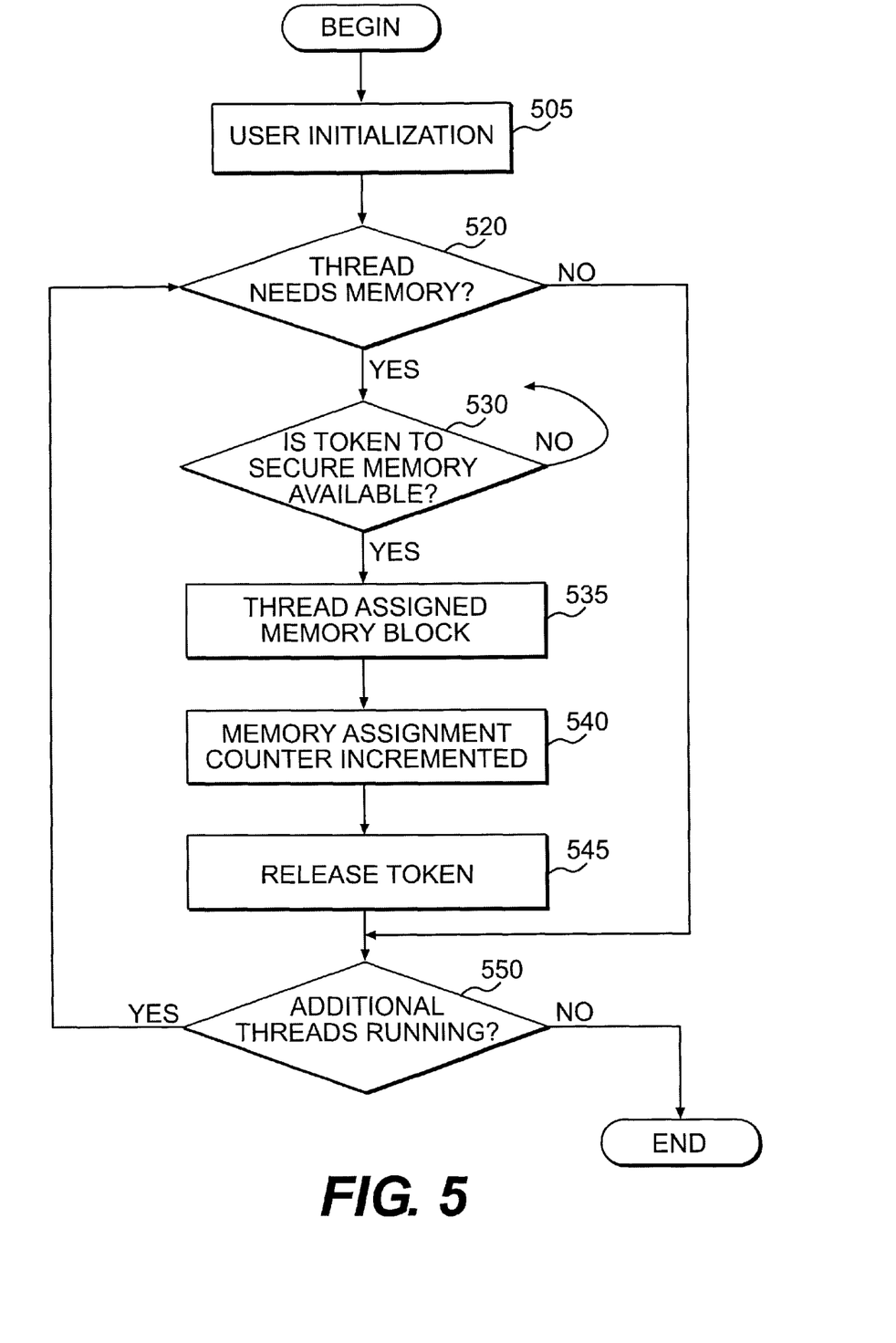
FIG. 5 depicts a flow chart illustrating operations performed by a shared memory allocation and coordination process consistent with an implementation of the present invention.

Further details on operation of a shared memory system operating in accordance with the principles of the shared memory protocol will now be explained with reference to the flow diagram of FIG. 5. Shared memory protocol begins with user initialization. During initialization, the user's program specifications are set for the size of both the shared memory and of the individual memory blocks to be assigned to threads accessing memory (step 505). The size of the shared memory area and the size of the memory blocks do not affect the operation of a shared memory allocation or distribution process consistent with the present invention. Therefore, the user may specify the sizes by using any number of criteria, for example, the memory requirements of a majority of the threads running.

Before attempting to secure access to a block of memory a thread determines whether another thread is securing access to a block of memory. If a thread determines that a "token" to secure access to memory is available (step 530), the thread secures a block of memory for itself by accessing the FAT (step 535).

Upon securing access to a block of memory, the FAT is used to assign the thread a memory location code representing the memory location of the memory block and a thread identification code, used to identify the thread within a process (step 535). Because threads are automatically assigned a next available memory block, threads of different processes may be assigned consecutive memory blocks. Each thread receives a memory block corresponding to the size of the memory blocks set by the user during initialization 505. If a thread requires more memory than that contained in an individual memory block, the thread will be assigned enough memory blocks to meet its request.

Once all of the location and identification assignments have been made, a memory assignment counter, maintained in the FAT region of the shared memory, is incremented (step 540). Incrementing the counter initiates setting a pointer to a next available memory location. Once a thread has secured access to a block of memory, the thread releases the "token" so that another thread may secure access to a block of memory (step 545).

A thread may place as many memory requests as needed. A shared memory system operating in accordance with the principles of the shared memory protocol ensures that all executing threads needing memory have an opportunity to secure access to memory by repeating the memory assignment process until all threads have completed execution (step 550).

CONCLUSION

Methods and systems consistent with the present invention coordinate distribution of shared memory among threads of control executing in a parallel computing environment. Distributing shared memory resources in a manner consistent with the principles of the present invention does not require accessing the operating system, a costly and time consuming event, to distribute shared memory among threads. Nor does a system consistent with the principles of the present invention require prohibiting competing threads from accessing a shared memory area while another thread accesses the memory.

Systems consistent with the present invention are applicable to all multi-threaded programs written in all computer programming languages, including Fortran 77, Java, C, and C++.

Although the foregoing description has been described with reference to a specific implementation, those skilled in the art will know of various changes in form and detail which may be made without departing from the spirit and scope of the present invention as defined in the appended claims and the full scope of their equivalents.

What is claimed is:

1. A method for allocating blocks of a shared memory in a data processing system, the system including a first process containing a first thread, and a second process containing a second thread, wherein the first and second process are assigned a first and second process identification code, respectively, the method comprising:

accessing by the first thread a file allocation table in the shared memory to secure access to a first block of the shared memory based on the determination that a token to secure memory access is available to the first thread;

securing the token by the first thread based on the determination;

assigning, by the file allocation table, a first memory location code to the first thread, wherein the memory location code corresponds to a memory location of the first block;

incrementing by the first thread a counter maintained in the file allocation table, wherein the counter points to an available memory block within the shared memory;

releasing the token by the first thread;

securing the token by the second thread; and assigning, by the file allocation table, a second memory location code to the second thread, wherein the second memory location code corresponds to a memory location of the available memory block within the shared memory, and wherein assigning the second memory location code takes place while the first thread accesses the first block of the shared memory.

2. The method of claim 1, wherein assigning a memory location code includes:

determining that the first thread requires memory larger then the size of the first block; and assigning additional consecutive memory blocks of the shared memory, starting at the first block, such that the aggregated size of the additional memory blocks, including the first block, is equal to or greater than the size of the required memory for the first thread.

3. The method of claim 1, wherein assigning a second memory location code to the second thread includes:

incrementing by the second thread the counter maintained in the file allocation table; and releasing the token by the second thread.

4. The method of claim 1, further including:

selecting by a user the size of the blocks of a shared memory, wherein the selection is performed prior to the first thread accessing the file allocation table to secure access to the first block of the shared memory.

5. A method for allocating blocks of a shared memory in a data processing system, the method comprising:

receiving a memory allocation request from a first thread;

allocating a first block of the shared memory to the first thread;

accessing the first block by the first thread;

denying a second memory allocation request by the first thread based on the determination that a token to secure memory access is secured by a second thread;

deallocating the first block from the first thread when the first thread has completed its use of the first block;

releasing the token by the second thread;

receiving a third memory allocation request from the first thread; and allocating a second block of the shared memory to the first thread based on the determination that the token is available to the first thread, wherein the second block is allocated to the first thread while the second thread is accessing the shared memory.

6. A method for allocating blocks of a shared memory in a data processing system, the method comprising:

receiving a memory allocation request from a first thread;

determining whether a token to secure a memory block within the shared memory is available for purposes of the memory allocation request;

identifying an available memory block in the shared memory in response to the memory allocation request based on a determination that access to the shared memory is permitted for purposes of the memory allocation request;

securing the token by the first thread;

incrementing a counter that designates another available memory block in the shared memory;

releasing the token by the first thread;

accessing by the first thread the available memory block;

receiving a second memory allocation request from a second thread;

securing the token by the second thread;

allocating the another available memory block to the second thread;

incrementing the counter;

releasing the token by the second thread; and accessing by the second thread the another available memory block.

7. The method of claim 6, wherein designating the available memory block in response to the request includes:

updating an area of memory with an address of an allocated memory block.

8. The method of claim 6, wherein a first process executes the first thread and a second process executes the at least other thread.

9. A memory allocating system, comprising:

a shared memory; and at least one processor executing at least one thread, wherein the at least one processor receives a memory allocation request from a first thread of the at least one thread, determines whether a token that enables a thread to secure access to a memory block is available, identifies a next available memory block in response to the memory allocation request based on a determination that the token is available, allows the first thread to secure the token, allocates the next available memory block to the first thread in response to the request, increments a counter that designates another available memory block in the shared memory, enables the first thread to release the token once the next available memory block is secured, grants access to the next available block, receives a second memory allocation request from a second thread, allows the second thread to secure the token, allocates the another available memory block to the second thread, increments the counter, enables the second thread to release the token and allows the second thread to access the another available memory block.

10. The system of claim 9, wherein the at least one processor updates an area of memory with an address of an allocated memory block.

11. The system of claim 9, wherein a first process executes the first thread and a second process executes the at least one other thread.

12. A computer-readable medium containing computer-readable instructions for performing a method on a data processing system for allocating blocks of a shared memory, the method comprising:

receiving a memory allocation request from a first thread;

determining whether a token to secure a memory block within the shared memory is available for purposes of the memory allocation request;

identifying an available memory block in the shared memory in response to the memory allocation request based on a determination that access to the shared memory is permitted for purposes of the memory allocation request;

securing the token by the first thread;

incrementing a counter that designates another available memory block in the shared memory;

releasing the token by the first thread;

accessing by the first thread the available memory block;

receiving a second memory allocation request from a second thread;

securing the token by the second thread;

allocating the another available memory block to the second thread;

incrementing the counter;

releasing the token by the second thread; and accessing by the second thread the another available memory block.

13. The computer-readable medium of claim 12, wherein designating the available memory block in response to the request includes:

updating an area of memory with an address of an allocated memory block.

14. The computer-readable medium of claim 12, wherein a first process executes the first thread and a second process executes the at least one other thread.

* * * * *